US009437009B2

(12) United States Patent
Medioni et al.

(10) Patent No.: US 9,437,009 B2
(45) Date of Patent: Sep. 6, 2016

(54) VISUAL TRACKING IN VIDEO IMAGES IN UNCONSTRAINED ENVIRONMENTS BY EXPLOITING ON-THE-FLY CONTEXT USING SUPPORTERS AND DISTRACTERS

(75) Inventors: Gerard Guy Medioni, Los Angeles, CA (US); Thang Ba Dinh, San Jose, CA (US)

(73) Assignee: University of Southern California, Los Angeles, CA (US)

( * ) Notice: Subject to any disclaimer, the term of this patent is extended or adjusted under 35 U.S.C. 154(b) by 1058 days.

(21) Appl. No.: 13/528,668

(22) Filed: Jun. 20, 2012

(65) Prior Publication Data

US 2015/0286872 A1 Oct. 8, 2015

Related U.S. Application Data

(60) Provisional application No. 61/499,101, filed on Jun. 20, 2011.

(51) Int. Cl.
*G06T 7/20* (2006.01)
(52) U.S. Cl.
CPC ............... *G06T 7/20* (2013.01); *G06T 7/204* (2013.01); *G06T 2207/20081* (2013.01); *G06T 2207/30196* (2013.01)
(58) Field of Classification Search
None
See application file for complete search history.

(56) References Cited

U.S. PATENT DOCUMENTS

| | | | |
|---|---|---|---|
| 7,302,451 B2 * | 11/2007 | Radhakrishnan | G06F 17/30787 |
| 7,403,634 B2 * | 7/2008 | Nishiura | G06T 7/20 |
| | | | 348/169 |
| 7,415,164 B2 * | 8/2008 | Wren | G06K 9/00711 |
| | | | 324/76.21 |
| 7,602,944 B2 | 10/2009 | Campbell et al. | |
| 7,756,296 B2 | 7/2010 | Porikli et al. | |
| 8,050,453 B2 * | 11/2011 | Yang | G06T 7/20 |
| | | | 382/100 |
| 8,135,221 B2 | 3/2012 | Jiang et al. | |
| 8,213,737 B2 * | 7/2012 | Steinberg | G06K 9/00248 |
| | | | 382/254 |
| 8,351,649 B1 | 1/2013 | Medioni et al. | |
| 2005/0226464 A1 | 10/2005 | Sun et al. | |

(Continued)

FOREIGN PATENT DOCUMENTS

WO 2009/124151 10/2009

OTHER PUBLICATIONS

M. Yang, Y. Wu, and G. Hua, "Context-Aware Visual Tracking," IEEE Transactions on Pattern Analysis and Machine Intelligence, vol. 31, No. 7, Jul. 2009. pp. 1195-1209.*

(Continued)

*Primary Examiner* — Matthew Bella
*Assistant Examiner* — Soo Shin
(74) *Attorney, Agent, or Firm* — Fish & Richardson P.C.

(57) ABSTRACT

The present disclosure describes systems and techniques relating to identifying and tracking objects in images, such as visual tracking in video images in unconstrained environments. According to an aspect, a system includes one or more processors, and computer-readable media configured and arranged to cause the one or more processors to: identify an object in a first image of a sequence of images, identifying one or more regions similar to the object in the first image of the sequence of images, identifying one or more features around the object in the first image of the sequence of images, preventing drift in detection of the object in a second image of the sequence of images based on the one or more regions similar to the object, and verifying the object in the second image of the sequence of images based on the one or more features.

11 Claims, 14 Drawing Sheets

(56) References Cited

U.S. PATENT DOCUMENTS

| | | | | |
|---|---|---|---|---|
| 2006/0036399 | A1* | 2/2006 | Yang | G06K 9/00261 702/181 |
| 2007/0101269 | A1 | 5/2007 | Hua et al. | |
| 2008/0193009 | A1* | 8/2008 | Sonoura | G01S 5/0294 382/153 |
| 2012/0051589 | A1* | 3/2012 | Schloegel | G06T 7/20 382/103 |
| 2015/0131858 | A1* | 5/2015 | Nakayama | G06K 9/4609 382/103 |

OTHER PUBLICATIONS

Z. Lin, "Modeling shape, appearance and motion for human movement analysis," PhD Thesis, University of Maryland, 2009.*
Z. Kalal, J. Matas, and K. Mikolajczyk, "P-N Learning: Bootstrapping Binary Classifiers by Structural Constraints," Computer Vision and Pattern Recognition (CVPR), 2010 IEEE, Jun. 2010, pp. 49-56.*
H. Grabner, J. Matas, L. Van Gool, and P. Cattin, "Tracking the Invisible: Learning Where the Object Might be," Computer Vision and Pattern Recognition (CVPR), 2010 IEEE, Jun. 2010, pp. 1285-1292.*
A. Adam, E. Rivlin, and I. Shimshoni. Robust fragments based tracking using the integral histogram. In CVPR, pp. 798-805, 2006.
S. Avidan. Support vector tracking. In PAMI, vol. 26, pp. 1064-1072, 2004.
B. Babenko, M.-H. Yang, and S. Belongie. Visual tracking with online multiple instance learning. In CVPR, pp. 983-990, 2009.
H. Bay, A. Ess, T. Tuytelaars, and L. V. Gool. SURF: Speeded up robust features. In CVIU, vol. 110, pp. 346-359, 2008.
A. Bosch, A. Zisserman, and X. Muoz. Image classification using random forests and ferns. In ICCV, pp. 1-8, 2007.
L. Breiman. Random forests. In ML, vol. 45, pp. 5-32, 2001.
D. Comaniciu, V. Ramesh, and P. Meer. Kernel-based object tracking. In PAMI, vol. 25, pp. 564-577, 2003.
T. B. Dinh, N. Vo, and G. Medioni. High resolution face sequences from a PTZ network camera. In FG, 2011.
S. K. Divvala, D. Hoiem, J. H. Hays, A. A. Efros, and M. Hebert. An empirical study of context in object detection. In CVPR, pp. 1271-1278, 2009.
M. Everingham, L. V. Gool, C. K. I. Williams, J. Winn, and A. Zisserman. The pascal visual object classes challenge 2007 (voc2007) results.
J. L. Fan, Y. Wu, and S. Y. Dai. Discriminative spatial attention for robust tracking. In ECCV, pp. 480-493, 2010.
H. Grabner, C. Leistner, and H. Bishof. Semi-supervised online boosting for robust tracking. In ECCV, pp. 234-247, 2008.
H. Grabner, J. Matas, L. V. Gool, and P. Cattin. Tracking the invisible: Learning where the object might be. In CVPR, pp. 1285-1292, 2010.
M. Isard and A. Blake. Condensation—conditional density propagation for visual tracking. In IJCV, vol. 29, pp. 5-28, 1998.
Z. Kalal, J. Matas, and K. Mikolajczyk. Online learning of robust object detectors during unstable tracking. In OLCV, pp. 1417-1424, 2009.
Z. Kalal, J. Matas, and K. Mikolajczyk. P-N learning: Bootstrapping binary classifiers by structural constraints. In CVPR, pp. 49-56, 2010.
C.-H Kuo, C. Huang, and R. Nevatia. Multi-target tracking by on-line learned discriminative appearance models. In CVPR, pp. 685-692, 2010.
J. S. Kwon and K. M. Lee. Visual tracking decomposition. In CVPR, pp. 1269-1276, 2010.
A. Li, F. Tang, Y. W. Guo, and H. Tao. Discriminative nonorthogonal binary subspace tracking. In ECCV, pp. 258-271, 2010.
L. J. Li, R. Socher, and L. F. Fei. Towards total scene understanding: Classification, annotation and segmentation in an automatic framework. In CVPR, pp. 2036-2043, 2009.

Y. Li, C. Huang, and R. Nevatia. Learning to associate: Hybridboosted multi-target tracker for crowded scene. In CVPR, pp. 2953-2960, 2009.
X. Mei and H. Ling. Robust visual tracking using L1 minimization. In ICCV, pp. 1436-1443, 2009.
D. Munoz, J. A. Bagnell, N. Vandapel, and M. Hebert. Contextual classification with functional max-margin markov network. In CVPR, pp. 975-982, 2009.
M. Ozuysal, M. Calonder, V. Lepetit, and P. Fua. Fast keypoint recognition using random ferns. In PAMI, vol. 32, pp. 448-461, 2010.
M. Ozuysal, P. Fua, and V. Lepetit. Fast keypoint recognition in ten lines of code. In CVPR, pp. 1-8, 2007.
M. Rohrbach, M. Stark, G. Szarvas, I. Gurevych, and B. Schiele. What helps where and why? semantic relatedness for knowledge transfer. In CVPR, pp. 910-917, 2010.
D. A. Ross, J. Lim, R.-S. Lin, and M.-H. Yang. Incremental learning for robust visual tracking. In IJCV, vol. 77, pp. 125-141, 2008.
M. Yang, Y.Wu, and G. Hua. Context-aware visual tracking. In PAMI, vol. 31, pp. 1195-1209, 2009.
Q. Yu, T. Dinh, and G. Medioni. Online tracking and reacquisition using co-trained generative and discriminative trackers and discriminative trackers. In ECCV, pp. 678-691, 2008.
Q. Yu and G. Medioni. Multiple-target tracking by spatiotemporal monte carlo markov chain data association. In PAMI, vol. 31, pp. 2196-2210, 2009.
Avidan, S., "Ensemble tracking," IEEE Computer Society Conference on Computer Vision and Pattern Recognition (CVPR), vol. 2, pp. 494-501, 2005.
Avidan, S., "Support Vector Tracking," IEEE Transactions on Pattern Analysis and Machine Intelligence (PAMI), vol. 26, No. 8, pp. 1064-1072 (2004).
Bjoerck, A. and G.H. Golub, "Numerical methods for computing angles between linear subspaces," Mathematics of Computation, vol. 27, No. 123, pp. 579-594 (Jul. 1973).
Black, M.J. and A.D. Jepson, "EigenTracking: Robust Matching and Tracking of Articulated Objects Using a View-Based Representation," International Journal of Computer Vision, vol. 26, No. 1, pp. 63-84 (1998).
Blum, A. and T. Mitchell., "Combining Labeled and Unlabeled Data with Co-Training," Annual Workshop on Computational Learning Theory, Proceedings of the eleventh annual conference on Computational learning theory (COLT 98), Madison, WI, USA, pp. 92-100 (1998).
Bordes, A. et al., "Fast kernel classifiers with online and active learning," Journal of Machine Learning Research, 6: 1579-1619 (2005).
Cauwenberghs, G. and T. Poggio, "Incremental and Decremental Support Vector Machine Learning," Advances in Neural Information Processing Systems (NIPS) 13, Proceedings of the 2000 Conference, T.K. Leen et al. (Eds.), Cambridge, Massachusetts: The MIT Press, pp. 409-415, 2001.
Collins, R.T., "Online selection of discriminative tracking features," IEEE Transactions on Pattern Analysis and Machine Intelligence (PAMI), vol. 27, No. 10, pp. 1631-1643, (Oct. 2005).
Dalal, N. and B. Triggs, "Histograms of oriented gradients for human detection," Proceedings of the 2005 IEEE Computer Society Conference on Computer Vision and Pattern Recognition (CVPR'05), pp. 886-893, 2005.
DeGroat, R.D. and R. Roberts, "Efficient, Numerically Stabilized Rank-One Eigenstructure Updating," IEEE Transaction on Acoustics, Speech, and Signal Processing, vol. 38, No. 2, pp. 301-316, (Feb. 1990).
Elgammal, A., "Learning to track: Conceptual Manifold Map for Closed-form Tracking," Proceedings of the 2005 IEEE Computer Society Conference on Computer Vision and Pattern Recognition (CVPR'05), vol. 1, pp. 724-730, (Jun. 2-25, 2005).
Feng Tang et al: "Co-Tracking Using, Semi-Supervised Support Vector Machines" Computer Vision, 2007. ICCV 2007. IEEE IIth International Conference 0 n, IEEE, PI, Oct. 1, 2007, pp. 1-8, XP031194443, ISBN: 978-1-4244-1630-1.

(56) References Cited

OTHER PUBLICATIONS

Grabner, M. et al., "Learning Features for Tracking," IEEE Conference on Computer Vision and Pattern Recognition (CVPR'07), Minneapolis, MN, Jun. 17-22, 2007, pp. 1-8.

Hall, P. et al., "Merging and Splitting Eigenspace Models," IEEE Transactions on Pattern Analysis and Machine Intelligence (PAMI), vol. 22, No. 9, pp. 1042-1049 (Sep. 2000).

Ho, J. et al., "Visual Tracking Using Learned Subspaces," Proceedings of the 2004 IEEE Computer Society Conference on Computer Vision and Pattern Recognition (CVPR '04), vol. 1, pp. 782-789, 2004.

Isard, M. and A. Blake, "Condensation—Conditional Density Propagation for Visual Tracking," International Journal of Computer Vision, vol. 29, No. 1, pp. 5-28 (1998).

Isard, M. and A. Blake, "Contour Tracking by Stochastic Propagation of Conditional Density," Computer Vision—ECCV'96, $4^{th}$ European Conference on Computer Vision (ECCV), Berlin, Germany: Springer-Verlag, Cambridge, UK, Apr. 15-18, 1996, Proceedings, vol. I, pp. 343-356, 1996.

Javed, O. et al., "Online Detection and Classification of Moving Objects Using Progressively Improving Detectors," Proceedings of the 2005 IEEE Computer Society Conference on Computer Vision and Pattern Recognition (CVPR'05), vol. 1, pp. 696-701, Jun. 20-25, 2005.

Jepson, A.D. et al., "Robust Online Appearance Models for Visual Tracking," IEEE Conference on Computer Vision and Pattern Recognition (CVPR), Kauai, Hawaii, Dec. 2001, vol. I, pp. I-415-I-422.

Kim, M., et al., "Face Tracking and Recognition with Visual Constraints in Real-World Videos," IEEE Conference on Computer Vision and Pattern Recognition (CVPR'08), Anchorage, AK, Jun. 23-28, 2008, pp. 1-8.

Kuang-Chih Lee et al: "Online Learning of Probabilistic Appearance Manifolds for Video-Based Recognition and Tracking", Computer Vision and Pattern Recognition, 2005 IEEE Computer Society Conference on, IEEE, Piscataway, NJ, USA, vol. 1, Jun. 20, 2005, pp. 852-859, XP010817361, DOI: D0I:10.1109/CVPR.2005.260, ISBN: 978-0-7695-2372-9 the whole document.

Lasserre, J.A. et al., "Principled hybrids of generative and discriminative models," Proceedings of the 2006 IEEE Computer Society Conference on Computer Vision and Pattern Recognition (CVPR'06), Jun. 17-22, 2006, pp. 87-94.

Lee, K.C. and D. Kriegman, "Online Learning of Probabilistic Appearance Manifolds for Video-based Recognition and Tracking," Proceedings of the 2005 IEEE Computer Society Conference on Computer Vision and Pattern Recognition (CVPR'05), vol. 1, pp. 852-859 (Jun. 20-25, 2005).

Levin, A. et al., "Unsupervised Improvement of Visual Detectors Using Co-Training," Proceedings of the Ninth IEEE International Conference on Computer Vision (ICCV), Nice, France, Oct. 13-16, 2003, pp. 626-633.

Li, Y. et al., "Tracking in Low Frame Rate Video: A Cascade Particle Filter with Discriminative Observers of Different Lifespans," IEEE Conference on Computer Vision and Pattern Recognition (CVPR. '07), pp. 1-8, 2007.

Lim, J. et al., "Incremental Learning for Visual Tracking," Advances in Neural Information Processing Systems (NIPS) 17: Proceedings of the 2004 Conference, L.K. Saul et al. (Eds.), Cambridge, Massachusetts: The MIT Press, pp. 793-800, 2005.

Lin, R.S. et al., "Adaptive Discriminative Generative Model and Its Applications," Advances in Neural Information Processing Systems (NIPS) 17: Proceedings of the 2004 Conference, L.K. Saul et al. (Eds.), Cambridge, Massachusetts: The MIT Press, pp. 801-808, 2005.

Liu, X. and T. Yu, "Gradient Feature Selection for Online Boosting," IEEE $11^{th}$ International Conference on Computer Vision (ICCV 2007), Rio de Janeiro, Brazil, Oct. 14-21, 2007, pp. 1-8.

Moghaddam, B. and A. Pentland, "Probabilistic Visual Learning for Object Representation," IEEE Transactions on Pattern Analysis and Machine Intelligence (PAMI), vol. 19, No. 7, pp. 696-710 (Jul. 1997).

Ng, A.Y. and M.I. Jordan, "On Discriminative vs. Generative classifiers: A comparison of logistic regression and naive Bayes," Advances in Neural Information Processing Systems (NIPS) 14, vol. II: Proceedings of the 2002 Conference, T.G. Dietterich et al. (Eds.), Cambridge, Massachusetts: The MIT Press, pp. 841-848, 2002.

Nguyen, H.T. and A.W.M. Smeulders, "Robust Tracking Using Foreground-Background Texture Discrimination," International Journal of Computer Vision, vol. 69, No. 3, pp. 277-293, 2006.

Oza, N.C. and S. Russell, "Online Bagging and Boosting," Artificial Intelligence and Statistics, 2001: Proceedings of the Eighth International Workshop, T. Jaakkola et al. (Eds.), San Francisco, CA: Morgan Kaufmann Publishers, Jan. 4-7, 2001, Key West, Florida, pp. 105-112 (2001).

Peter Roth et al: "Conservative Visual Learning for Object Detection with Minimal Hand Labeling Effort", Pattern Recognition Lecture Notes in Computer Science;;LNCS, Springer, Berlin, DE, vol. 3663, Jan. 1, 2005, pp. 293-300, XP019018030, ISBN: 978-3-540-28703-2.

Platt, J.C., "Probabilities for SV Machines," Chapter 5 in *Advances in Large Margin Classifiers*, Alexander J. Smola et al. (Eds.), Cambridge, Massachusetts: The MIT Press, pp. 61-71, 2000.

Qian, Yu, "Online Tracking and Reacquisition Using Co-Trained Generative and Discriminative Trackers", Computer Vision ECCV 2008, (Lecture Notes in Computer Science), Springer Berlin Heidelberg, Berlin, Heidelberg, vol. 5303, Oct. 12, 2008, pp. 678-691, XP019109234, ISBN: 978-3-540-88685-3.

Raina, R. et al., "Classification with Hybrid Generative/Discriminative Models," Advances in Neural Information Processing Systems (NIPS) 16, Proceedings of the 2003 Conference, S. Thrun et al. (Eds.), Cambridge, Massachusetts: The MIT Press, pp. 545-552, 2004.

Reise, Franck, Authorized Officer, European Patent Office, PCT International Application No. PCT/US2009/039214, in International Search Report, mailed Feb. 28, 2011, 15 pages.

Ross et al., "Incremental Learning for Robust Visual Tracking," published online on Aug. 17, 2007, Int. J. Comput. Vis. (2008) 77:125-141, 17 pages.

Roth et al., "Conservative Visual Learning for Object Detection with Minimal Hand Labeling Effort", Jan. 1, 2005, Pattern Recognition Lecture Notes in Computer Science; LNCS, Springer, Berlin, DE, vol. 3663, pp. 293-300, 8 pages.

Tang, F. et al., "Co-Tracking Using Semi-Supervised Support Vector Machines," IEEE 11th International Conference on Computer Vision (ICCV 2007), Oct. 14-21, 2007, pp. 1-8.

Tenenbaum, J.B. et al., "A Global Geometric Framework for Nonlinear Dimensionality Reduction," Science, vol. 290, No. 5500, pp. 2319-2323, 2000.

Vishwanathan, S.V.N., "Simple SVM," Proceedings, Twentieth International Conference on Machine Learning (ICML), T. Fawcett and N. Mishra 9(Eds.), Menlo Park, CA: AAAI Press, pp. 760-767, 2003.

Wu, B. and R. Nevatia, "Improving Part based Object Detection by Unsupervised, Online Boosting," IEEE Conference on Computer Vision and Pattern Recognition (CVPR), pp. 1-8, Jun. 17-22, 2007.

Yang, M. and Y. Wu, "Tracking Non-stationary Appearances and Dynamic Feature Selection," IEEE Computer Society Conference on Computer Vision and Pattern Recognition (CVPR'05), vol. 2, pp. 1059-1066, Jun. 2-25, 2005.

Yilmaz, A. et al., "Object Tracking: A Survey," ACM Comput. Surv., vol. 38, No. 4, Article 13, 45 pages, 2006.

Yu, Q. et al., "Online Tracking and Reacquisition Using Co-trained Generative and Discriminative Trackers," ECCV08, II: 678-691 (2008).

\* cited by examiner red  lost target

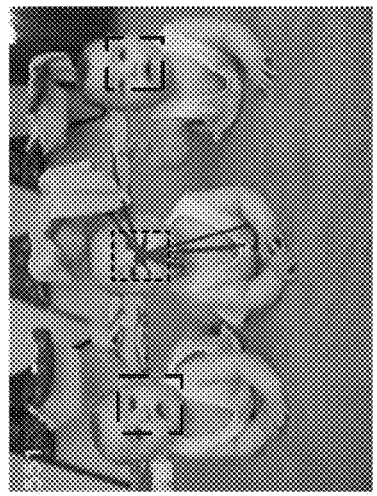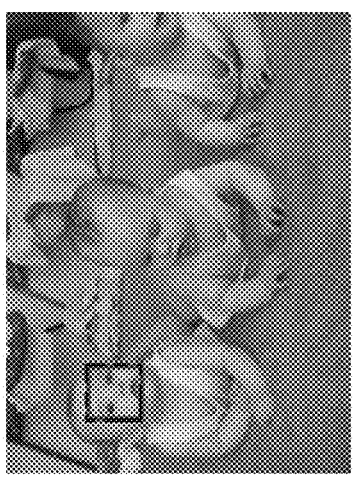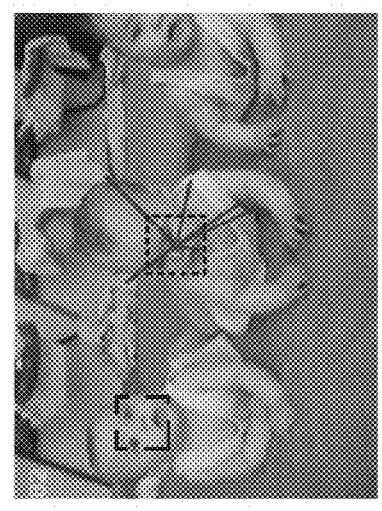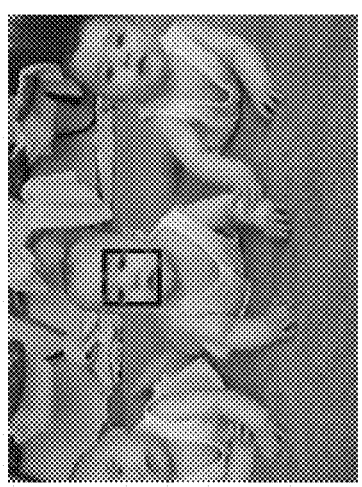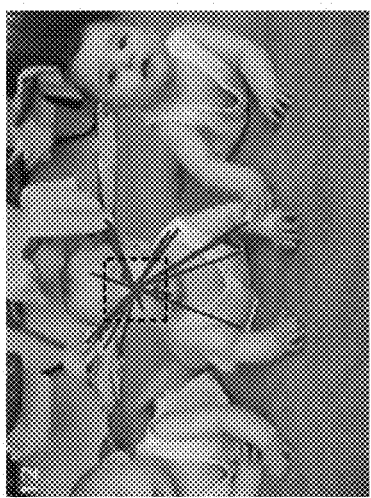
Fig. 5C
Fig. 5D

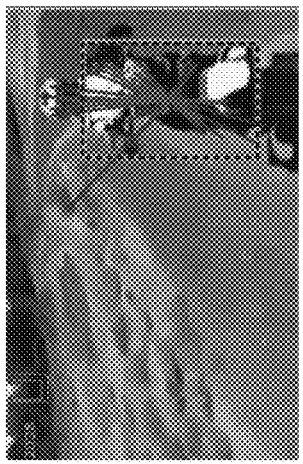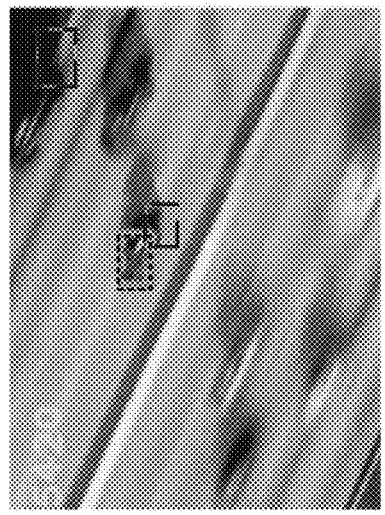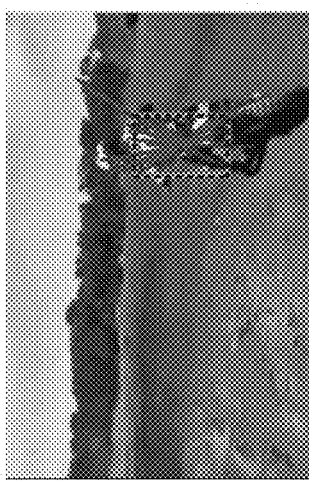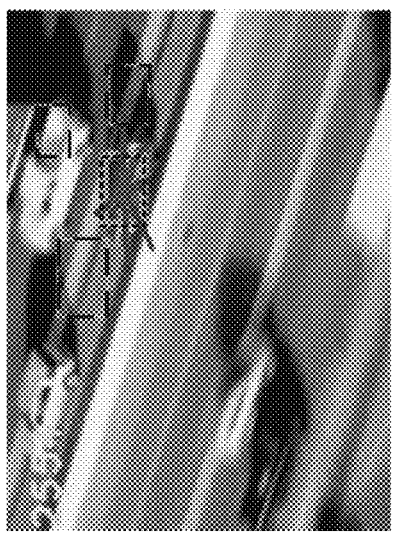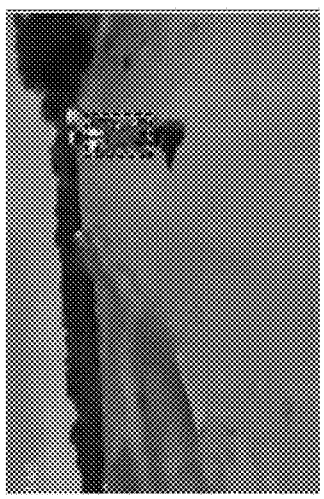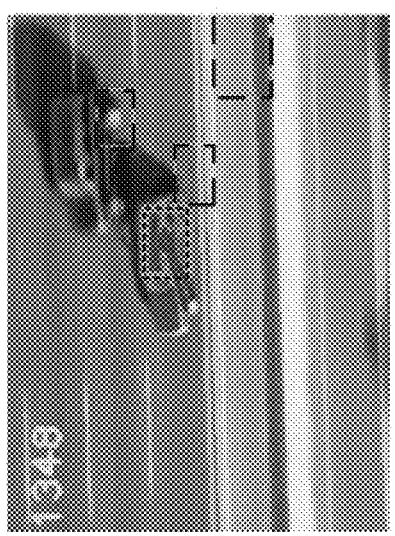
*Fig. 6C*
*Fig. 6D*

VISUAL TRACKING IN VIDEO IMAGES IN UNCONSTRAINED ENVIRONMENTS BY EXPLOITING ON-THE-FLY CONTEXT USING SUPPORTERS AND DISTRACTERS

CROSS REFERENCE TO RELATED APPLICATIONS

This application claims priority under 35 U.S.C. §119(e) to U.S. Provisional Application Ser. No. 61/499,101, entitled "VISUAL TRACKING IN VIDEO IMAGES IN UNCONSTRAINED ENVIRONMENTS BY EXPLOITING ON-THE-FLY CONTEXT USING DISTRACTERS AND SUPPORTERS," and filed on Jun. 20, 2011. The disclosure of the above application is incorporated herein by reference in its entirety.

STATEMENT AS TO FEDERALLY SPONSORED RESEARCH

This invention was made with government support under grant number W911NF-06-1-0094 awarded by the MURI-ARO (Multidisciplinary University Research Initiative/Army Research Office). The government has certain rights in the invention.

BACKGROUND

This document relates to identifying and tracking objects in images, such as visual tracking in video images in unconstrained environments.

Visual tracking in unconstrained environments is very challenging due to the existence of several sources of varieties such as changes in appearance, varying lighting conditions, cluttered background, and frame-cuts. A major factor causing tracking failure is the emergence of regions having similar appearance as the target. It is even more challenging when the target leaves the field of view (FoV) leading the tracker to follow another similar object, and not reacquire the right target when it reappears.

SUMMARY

Visual tracking in unconstrained environments can be improved by exploiting the context on-the-fly in two terms: distracters and supporters. Both of these can be automatically explored using a sequential randomized forest, an online template-based appearance model, and local features. Distracters are regions which have similar appearance as the target and consistently co-occur with a high confidence score. The tracker can keep tracking these distracters to avoid drifting. Supporters, on the other hand, are local key-points around the target with consistent co-occurrence and motion correlation in a short time span. They can play an important role in verifying the genuine target. Extensive experiments on challenging real-world video sequences show the tracking improvement when using this context information. Comparisons with several state-of-the-art approaches are also provided.

An aspect of the subject matter described in this specification can be embodied in a method that includes receiving video data, tracking a single target identified in the video data, and outputting information corresponding to the tracked target. The tracking can include detecting and using one or more distracters and one or more supporters, where a distracter has an appearance similar to that of the tracked target, and a supporter has points outside of the tracked target that have motion correlation with the tracked target. Detection of the target and the one or more distracters can be done using a shared classifier having binary testing functions corresponding to positive and negative samples added during training, but not including hard negative samples. In addition, a distracter can be discarded from the one or more distracters when its appearance changes to no longer be similar to the target, or when it can no longer be tracked, or both.

Detecting the one or more supporters can be done using a sliding window of k frames in the video data and by distinguishing active supporters from passive supporters. The one or more distracters can be explored using a sequential randomized forest and a template-based appearance model, where the template-based appearance model is constructed in a binary search tree using k-means, and the one or more supporters are local features. In addition, a maximum number of the one or more distracters and a maximum number of the one or more supporters can be limited in some implementations. Further detailed implementations of this method aspect of the subject matter are described below and can be embodied in a non-transitory computer-readable medium encoding instructions that cause computing apparatus to perform operations of the methods. These methods can also be implemented in various computer systems, such as a recognition system, a face tracking system, and a pedestrian tracking system.

Another aspect of the subject matter described in this specification can be embodied in a method that includes identifying an object in a first image of a sequence of images, identifying one or more regions similar to the object in the first image of the sequence of images, identifying one or more features around the object in the first image of the sequence of images, preventing drift in detection of the object in a second image of the sequence of images based on the one or more regions similar to the object, and verifying the object in the second image of the sequence of images based on the one or more features. The method can also include representing the object and each of the one or more regions by individual evolving templates, and representing each of the one or more features as a keypoint having a descriptor of a region around the feature.

Identifying the object can include tagging the object in the first image of the sequence of images based on received input. The received input can be input received from a user, which can include a point selection or a bounding box selection. Moreover, identifying the object can include detecting the object in the first image of the sequence of images using a classifier. Further detailed implementations of this method aspect of the subject matter are described below and can be embodied in a non-transitory computer-readable medium encoding instructions that cause computing apparatus to perform operations of the methods. These methods can also be implemented in various computer systems, such as a recognition system, a face tracking system, and a pedestrian tracking system.

In various implementations, one or more of the following features and advantages can be provided. A tracking method can automatically explore context information in video data in two semantic terms: distracters and supporters. A tracker can successfully take advantage of the context to overcome challenges in tracking in unconstrained environments with occlusion, abrupt motion, motion blur, and frame-cut. Moreover, with the context, the tracker can explicitly handle the situation where several objects similar the target are present.

In addition, experiments have demonstrated that a tracker in accordance with the present invention can outperform other state-of-the-art methods.

The above and other aspects and embodiments are described in greater detail in the drawings, the description and the claims.

DESCRIPTION OF DRAWINGS

FIGS. 5A-5D show results of running different trackers on two challenging sequences of video.

FIGS. 6A-6D show results of running a tracker in accordance with the present invention on additional sequences of video.

DETAILED DESCRIPTION

Long-term visual tracking in unconstrained environments is critical for many applications such as video surveillance, and human computer interaction. A major research axis has been focused on building a strong model to encode the variations of object appearance while distinguishing it from the background. By doing this, a fundamental dilemma occurs: the more complex the appearance model, the more expensive it is. At the extreme, the emergence of cluttered background and the occurrence of regions having similar appearance as the target makes appearance modeling very challenging.

In fact, there is additional information which can be exploited instead of using only the object region. Context information has been applied actively in object detection (see S. K. Divvala, et al., "An empirical study of context in object detection", in CVPR, pages 1271-1278, 2009), object classification (see L. J. Li, et al., "Towards total scene understanding: Classification, annotation and segmentation in an automatic framework", in CVPR, pages 2036-2043, 2009; and D. Munoz, et al., "Contextual classification with functional max-margin markov network", in CVPR, pages 975-982, 2009), and object recognition (see M. Ozuysal, et al., "Fast keypoint recognition in ten lines of code", in CVPR, pages 1-8, 2007). It has been employed in various tracking methods (see D. A. Ross, et al., "Incremental learning for robust visual tracking", in IJCV, volume 77, pages 125-141, 2008; and H. Grabner, et al., "Tracking the invisible: Learning where the object might be", in CVPR, pages 1285-1292, 2010). However, in many respects, context has been largely overlooked in visual tracking applications due in part to the fast run-time requirement. Also, visual tracking, especially single object tracking, is considered as a semi-supervised problem where the only known data is the object bounding box in the first frame (or in first few frames), which means learning such a context needs to be performed on-the-fly.

Figure 1A:
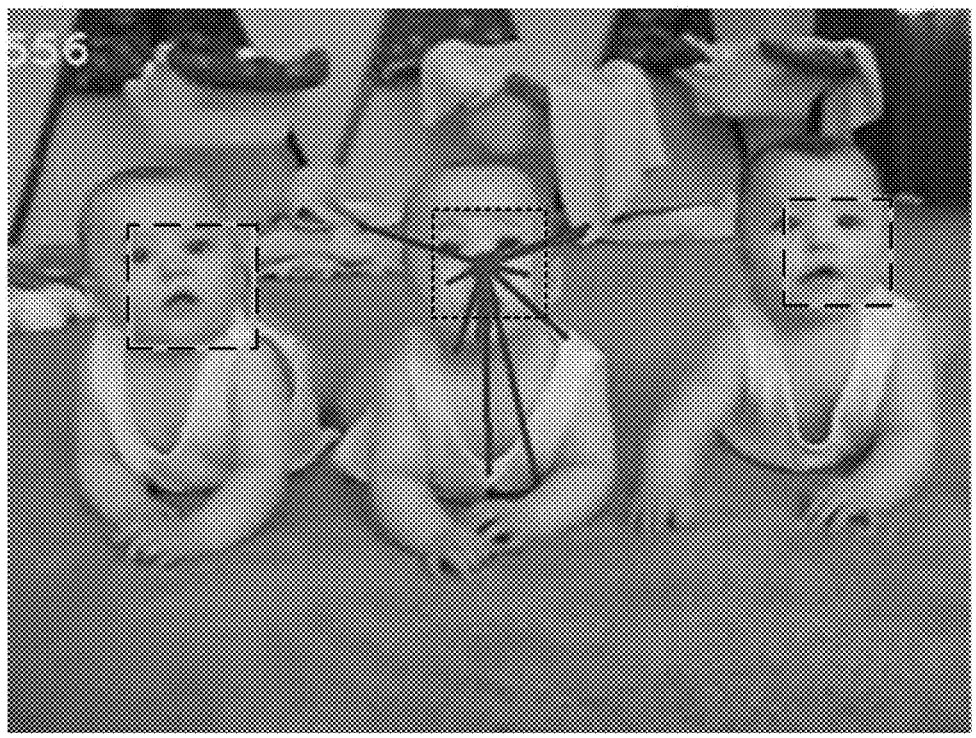
FIGS. 1A-1D show examples in which context elements including distracters and supporters are explored by a tracker.
Figure 1B:
Figure 1B:
Figure 1B:
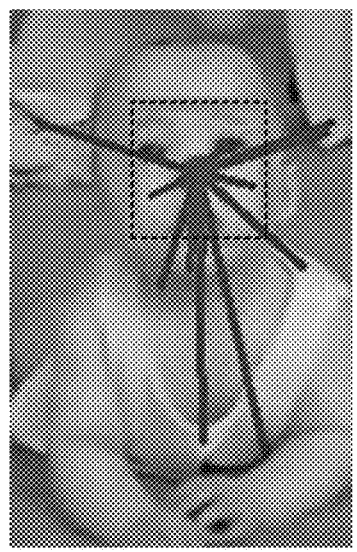
Figure 1C:
Figure 1D:
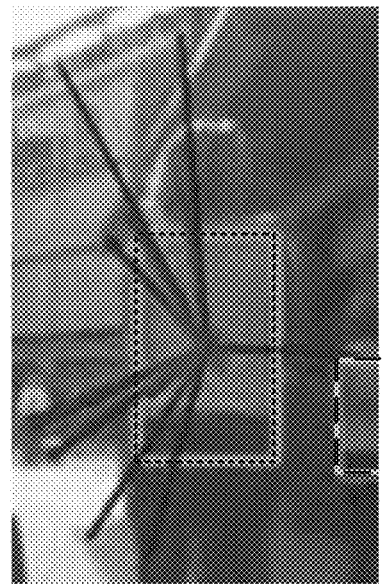

In the present disclosure, context information is exploited by expressing it in two different terms: 1) distracters are regions that have similar appearance as the target, and 2) supporters are local key-points around the object having motion correlation with the target in a short time span. Some examples of these elements that can be automatically explored during tracking by a tracker are shown in FIGS. 1A-1D, where the distracters are identified by cyan bounding boxes, the target is identified by a green bounding box, and supporters are the end-points of the lines extending from the target. FIG. 1A shows three babies, where one baby's face is the target being tracked and the other baby faces are the distracters. FIG. 1B shows a close up of the target baby with the supporters associated therewith. FIG. 1C shows a street scene, where one person is the target being tracked and other elements from the scene are the distracters. FIG. 1D shows a close up of the target person with the supporters associated therewith.

Distracters typically share the same type as the target, for example other faces in face tracking, or other pedestrians in pedestrian tracking. Supporters occur in regions belonging to the same object as the target, but are not included in the initial bounding box. In other words, the goal of the algorithm is to find all possible regions which look similar to the target to prevent drift, and to look for useful information around the target to have strong verification. The target and distracters can be detected using shared sequential randomized ferns, such as described in M. Ozuysal, et al. "Fast key-point recognition using random ferns", in PAMI, volume 32, pages 448-461, 2010, which is hereby incorporated by reference. They can also be represented by individual evolving templates. The supporters, on the other hand, can be represented as keypoints, and described using descriptors of the local region around them. Experiments show that using these context elements helps the tracker avoid drifting to another object in a cluttered background and helps reacquire the right target after it leaves the FoV, or after total occlusion, without confusion.

Region-based tracking approaches have been used in visual tracking. To track an object frame by frame, most algorithms try to search for the best match. Some methods simply assume a search area where the object is expected while some others use state prediction such as a particle filter. These methods face several challenges in practice such as abrupt motion, frame-cut, and object leaving FoV. To address this issue, a fast detector has been proposed based on a randomized forest to exhaustively scan through the whole image, selecting several candidates, followed by an evaluation step from the online template-based object model (see Z. Kalal, et al., "P-N learning: Bootstrapping binary classifiers by structural constraints", in CVPR, pages 49-56, 2010; and Z. Kalal, et al., "Online learning of robust object detectors during unstable tracking", in OLCV, pages 1417-1424, 2009).

In region-based visual tracking, the appearance model plays an essential role. Some methods model the appearance of an object in a generative way such as using histogram and linear subspace, while others build the appearance model as a classifier between the object and background. Also, some hybrid methods have been proposed to fuse both types. Since visual tracking is a semi-supervised problem where the incoming data is unknown, online appearance modeling may be preferable to an offline one. To track the target successfully, these methods build an appearance model which is not only able to adapt to all changes well, but also robust against background. This leads to a trade-off: a tracker is fast but vulnerable to drift.

Moreover, the context information such as other moving objects and other regions interacting with the target have been overlooked by these approaches. Some have proposed to explore a set of auxiliary objects which have strong motion correlation and co-occurrence with the target in a short term (see D. A. Ross, et al., "Incremental learning for robust visual tracking", in IJCV, volume 77, pages 125-141, 2008). Also, they should preferably be tracked easily. The color over segmentation can be employed to find such an object, then Meanshift (see D. Comaniciu, et al., "Kernel-based object tracking", in PAMI, volume 25, pages 564-577, 2003) can be applied to track them. However, Meanshift and color information are vulnerable in a cluttered background and the fusion of multiple components, i.e., the technique for auxiliary objects in this method is ad-hoc.

To get support from other areas. Grabner et al. introduced the definition of supporters which are useful features to predict the target location (see H. Grabner, et al., "Semi-supervised online boosting for robust tracking", in ECCV, pages 234-247, 2008, which is hereby incorporated by reference). These features should have some temporal relation in motion with the current target. However, to detect and match all local features in each frame is expensive. Also, in unconstrained environments, the motion of the object leaving the FoV and under total occlusion is not easily predicted, and a wrong guess may ruin the result. Others have proposed to learn the attentional regions which have strong discriminative power in their discriminative domains, i.e., the regions which are distinctive from others in the defined region (see J. L. Fan, et al., "Discriminative spatial attention for robust tracking", in ECCV, pages 480-493, 2010). But this method is still limited by the use of local and semi-local areas around the target, which is not efficient in the presence of abrupt motions and frame-cuts.

In addition, related work includes the tracker built on P-N learning (see Z. Kalal, et al., "Online learning of robust object detectors during unstable tracking", in OLCV, pages 1417-1424, 2009). Basically it inherits the power of tracking-learning-detection (TLD) framework (see Z. Kalal, et al., "Online learning of robust object detectors during unstable tracking", in OLCV, pages 1417-1424, 2009) while focusing on exploring the structure of unlabeled data, i.e., the positive and negative structures. Even though the method claims to explore the hard negative samples which contain other moving objects, which can be considered distracters, when an object has similar appearance to the target, dominant positive training samples allow the tracker to detect it as positive. In contrast, training those hard negative samples makes the object model over-fit.

Moreover, since the method uses a template-based appearance model, it may require the object region to fit into a bounding box without much background included. This can limit the tracker from taking advantage of more useful information on other parts of the target with complex shape appearance such as a human body. Also, because the P-N Tracker purely relies on template matching to find the best match among several candidates, it is vulnerable to switching to another similar object. To address these issues, the present systems and techniques can employ the tracking-learning-detection concept of this tracker to not only explore the structure of positive and negative data but also the more semantic data: distracters and supporters. It is worth noting that the present method need not aim to solve the multi target tracking (MTT) problem, where data association is the most important component. In MTT, most methods employ an object detector or background subtraction to find possible object responses. In contrast, the present systems and techniques can automatically exploit and track all regions with similar appearance to the target. Based on the context model, i.e., supporters and distracters, and the appearance model, the tracker can avoid confusion during tracking.

Figure 2A:
FIGS. 2A-2D show an example in which a target leaves the field of view and then returns.
Figure 2B:
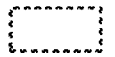
Figure 2B:
Figure 2B:
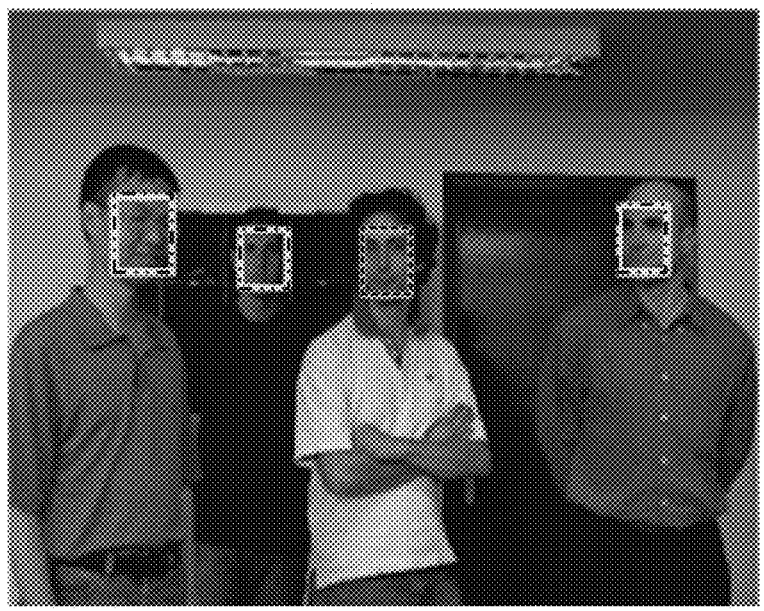
Figure 2C:
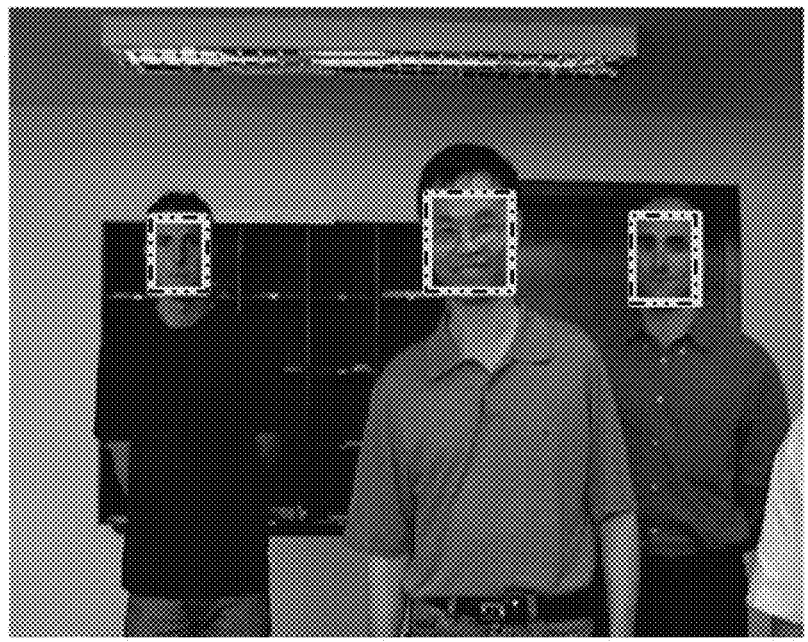
Figure 2D:
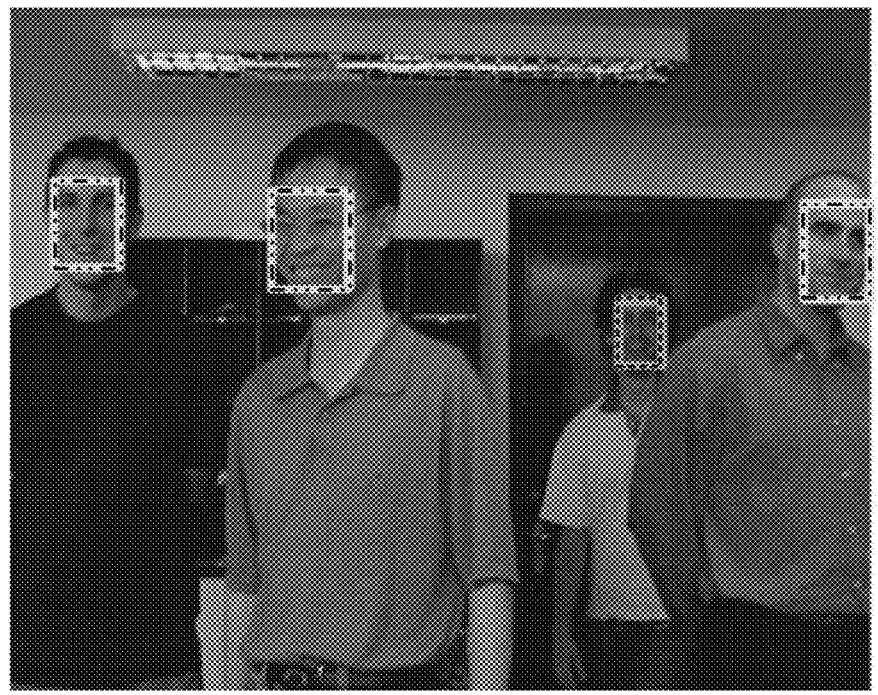

Distracters are regions which have appearance similar to the target and consistently co-occur with it. Usually, distracters are other moving objects sharing the same object category as the target. FIGS. 2A-2D show an example in which a target leaves the field of view (FoV) and then returns. In FIG. 2A, a target is identified (shown with a green bounding box) at initialization. In FIG. 2B, distracters are also identified (shown with yellow bounding boxes) and exploited while tracking the target. FIG. 2C shows that tracking of the distracters continues even when the target object leaves the FoV. FIG. 2D shows reacquisition of the target when it returns to the FoV, without confusion with the distracters. Building an appearance model to distinguish objects of the same type can be done by developing a recognition system that uses a large amount of supervised samples to train. However, in visual tracking, the tracker has temporal and spatial information help to exploit which region is considered dangerous to preclude. To prevent the tracker described here from drifting to these regions, one can detect and initiate a simple tracker for each of them so that confusion can be minimized during tracking.

Due to the efficiency of the randomized ferns classifier, which is widely used in recognition and tracking, this classifier can be employed to detect possible distracters in every frame. Randomized ferns were originally proposed by M. Ozuysal et al. (see M. Ozuysal, et al., "Fast key-point recognition using random ferns", in PAMI, volume 32, pages 448-461, 2010) to increase the speed of randomized forest (see L. Breiman, "Random forests", in ML, volume 45, pages 5-32, 2001). Unlike the tree-structure in randomized forest, ferns, having non-hierarchical structures, consist of a number of binary testing functions. In the present example, each of them corresponds to a set of binary pattern features. Each leaf in a fern records the number of added positive and negative samples during training. For a test sample, its evaluation by calculating the binary pattern features leads it to a leaf in the fern. After that, the posterior probability for that input testing sample in feature vector $x_i$ to be labeled as an object (y=1) by a fern j is computed as $Pr_j(y=1|x_i)=p/(p+n)$, where p and n are the number of positive and negative samples recorded by that leaf. The posterior probability is set to zero if there is no record in that leaf. The final probability is calculated by averaging the posterior probabilities given by all ferns:

$$Pr(y=1|x_i) = \sum_{1}^{T} Pr_j(y=1|x_i) \qquad (1)$$

where T is the number of ferns. To improve the running time, these randomized ferns can be shared between the object detector and the distracter detector. Each tracker can control the posterior probability by adding its positive and negative samples to the ferns according to the P-constraints and N-constraints, respectively as in P-N learning by Z. Kalal, et al. The P-constraints force all samples close to the validated trajectory to have positive label, while N-constraints have all patches far from the validated trajectory labeled as negative.

Different from P-N learning, we avoid adding hard negative samples to avoid over-fitting. Also, during tracking, when the appearance of a distracter is different from the target, it can be discard. Indeed, it helps to emphasize that the focus here is on tracking a single target, not on multiple target tracking. This clearly explains the intuition: when several objects have similar appearance to the target object, the target tracker pays attention to them; if these distracters change their appearance and no longer look like the target object, they can be ignored.

Therefore, a sample can be considered a distracter candidate if it passes the random ferns with a probability $Pr(y=1|xi)>0.5$, and is not the target. Further details regarding how to determine a candidate as the target are presented below. In addition, an M frames sliding window can be maintained, and the frequency $fd_k$ of a candidate k can be counted based on its appearance consistency spatial consistency related to the target. Then a candidate can be classified as a distracter as follows $$P_d(yd=1 \mid x_1) = \begin{cases} 1 & \text{if } fd_k > 0.5 \\ & \text{and } d(x_i, M) > 0.8 \\ 0 & \text{otherwise} \end{cases} \quad (2)$$

where $P_d(yd=1|x_i)$ is the probability for a candidate i in a feature vector $x_i$ having label $y_d$, while $d(x_i, M)$ is the confidence of this candidate evaluated by the template-based model of the target. The first condition allows detection of distracters that repeatedly co-occur with the target, while the second one helps to exploit distracters having very similar appearance to the target.

In addition to using distracters, an efficient supporters set can be built, which helps to quickly verify the location of the target. Supporters are features which consistently occur around the object, such as shown in FIGS. 3A-3D. They also have a strong correlation in motion with the target. It should be noted that the goal is tracking in unconstrained environment with several challenges such as frame-cuts and abrupt motion due to hand-held camera recording. This can limit the use of a motion model to predict the location of a target based on the motion of the supporters (as in H. Grabner, et al., "Tracking the invisible: Learning where the object might be", in CVPR, pages 1285-1292, 2010) or of the auxiliary objects (as in D. A. Ross, et al., "Incremental learning for robust visual tracking", in IJCV, volume 77, pages 125-141, 2008).

Figure 3A:
FIGS. 3A-3D show an example in which a target is first occluded and then not.

In addition, the candidate responses are obtained based on detection. The supporters are detected from the local region around each candidate. FIG. 3A shows detection of all supporters. After that, these supporter detection responses are matched with the ones from previous frames to find the co-occurrence between them and the target. In fact, from these results, the motion correlations can also be inferred without using very complex motion models typically needed in unconstrained environments, and detectors that provide a list of interest points (e.g., Sift, Surf, Orb, etc.) can be used. Moreover, unlike the supporters proposed in H. Grabner, et al., "Tracking the invisible: Learning where the object might be", in CVPR, pages 1285-1292, 2010, which are expensive to detect and match in the whole frame, the present supporters can be efficiently detected and matched around the locations of the very few candidates having high probability to be the target in each frame.

To detect supporters, the Fast Hessian Detector can be used, and SURF descriptor (as in H. Bay, et al., "SURF: Speeded up robust features", in CVIU, volume 110, pages 346-359, 2008) can be employed to describe the region around them. All of these supporters can be stored in a sliding window of k frames. In some implementations, k=5, whereas k can be set with other values in other implementations. Using higher values for k can result in the process running slower, depending on the computer hardware used, while lower values for k may not perform as well because, while the status of supporters need only be tracked for a short amount of time, this time frame cannot be too short. In practice, imposing a k limitation, as discussed here, is less important when using sufficient computation resources.

Figure 3B:

There are two types of supporters: active and passive. FIG. 3B shows learning of the active supporters for the target, where active supporters are shown with pink dots having arrows pointing to the black dot center of the target, and passive supporters are shown with blue dots without arrows. The active supporters are the ones co-occurring with the target in high frequency, e.g., fs>0.5, within the sliding window, while passive ones are the rest. When there are regions having similar appearance to the target but not being tracked by distracter trackers, all of SURF features can be detected around these regions. After that, they can be matched to the supporter model, which basically are the latest descriptors of the supporters in the sliding window. Finally, the supporting score can be computed as follows $$S_i = \frac{n_{am}}{n_{ta}} \quad (3)$$

where $n_{am}$ and $n_{ta}$ are the numbers of active matched supporters and total active supporters in the model. A supporter model is considered strong if $S_i>0.5$ and $n_{ta}>5$ (to avoid the unstable information within non-textured regions around the target). Then all of the matched results can be used to update the supporter model. Note that the unmatched results can also be added to the model.

As noted above, the context tracker can exploit context information while tracking and takes advantage of this information to avoid drift. The P-N Tracker (Z. Kalal, et al., "P-N learning: Bootstrapping binary classifiers by structural constraints", in CVPR, pages 49-56, 2010, which is hereby incorporated by reference) can be used as the basic target tracker with several extensions. First, the randomized ferns can be extended to accept multiple objects. Note that this is not equivalent to a multi-class classifier because each object preserves its own posterior probability while they may share the same object type as the target. Second, the 6 bitBP (such as described in T. B. Dinh, et al., "High resolution face sequences from a PTZ network camera", in FG, 2011, which is hereby incorporated by reference) can be used, which helps to boost up the speed of the detector. The 6 bitBP makes use of the constant value of each whole patch during evaluation. Third, instead of using only the first initial patch as the object model, which is quite conservative and vulnerable to appearance changes, an online template-based object model (as in Z. Kalal, et al., "Online learning of robust object detectors during unstable tracking", in OLCV, pages 1417-1424, 2009, which is hereby incorporated by reference) can be used.

Figure 3C:
Figure 3D:

However, this model can be improved by constructing it in binary search tree using k-means. The model can be iteratively split into two subsets to form a binary tree. By doing this, the computational complexity to evaluate a sample is $O(\log_n)$ instead of $O(n)$ when using Brute-force. This improvement is important in improving the running time because the online model linearly grows to adapt to appearance changes. It is worth noting that other tracking methods can also be extended using these concepts. However, the PN-Tracker may be a better starting point because it uses a scanning window to search for all of possible candidates in the whole image, which helps to explore the context at the same time. Also, the randomized forest can be extendable to reduce the cost of initializing a totally new tracker for a distracter. Using such techniques, a system can avoid drifting to other regions while the target is under occlusion, as shown in FIG. 3C, and the target can be readily reacquired with the strong supporter model, as shown if FIG. 3D.

As discussed above, distracters are regions which have similar appearance as the target. In the tracker, a testing sample confidence score can be computed using Normalized Cross-Correlation (NCC) between it and the closest image patch in the object model. The region having the highest confidence is considered as the current target if its score is larger than a threshold $\theta=80\%$. However, in practice, there are typically several other regions satisfying this condition. After choosing the best candidate as the tracking result (see Algorithm 1 below), all other responses can be associated to the distracter trackers using greedy association: the tracker producing higher confidence on a patch is associated with higher priority. The remaining regions can also trigger new distracter trackers. These trackers can be formulated similarly to the basic tracker. However, to avoid the increasing number of unnecessary trackers, they can be terminated whenever they lose their target.

Assuming that one has the valid target at frame t, the supporters are extracted from a defined region around the location of that target, such as within a radius R from the center of the target. As another example, in some implementations, the supporters can be extracted from the rectangle having three times the width and the height of the current target, with the same center. Other parameters can be used here for supporter extraction around the target. In any case, after extraction of supporters, a sliding window of k=5 frames can be used to store and match the previous supporters with the current ones. Each match makes the frequency of that supporter increase by 1.

Figure 4A:
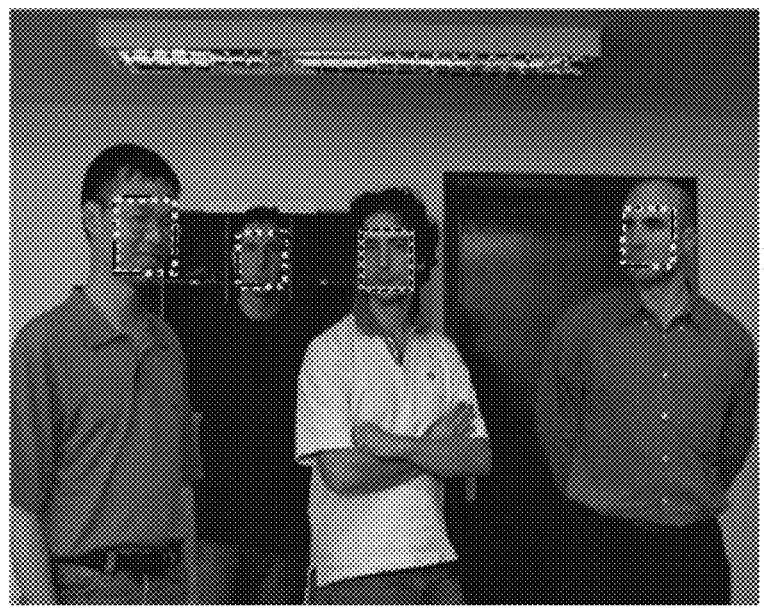
FIGS. 4A-4B show a case where the target drifts to another object when the original target changes in appearance.
Figure 4B:
Figure 4B:

As discussed above, in practice, there are several candidates similar to the target with very high confidence score. In fact, the right candidate may not even obtain the highest score, especially when the appearance is changing. For example, FIGS. 4A-4B show a case where the target drifts to another object with the highest score when the original target changes in appearance so much that is exceeds a threshold and is lost (the lost target is identified in FIG. 4B with a red bounding box). Without context, the tracker obviously switches to the one with the highest score. Also, in unconstrained environments, the target may leave the FoV, or be completely occluded by other objects. In such cases, the tracker will simply switch to another region satisfying the threshold $\theta$. In contrast, a tracker as described herein can automatically exploit all the distracters and pays attention to them by tracking them simultaneously. Also, the tracker can discover a set of supporters to robustly identify the target among other similar regions. Table 1 below provides a detailed example aogrithm.

TABLE 1

Algorithm 1 Context Tracker

- init target T*, Distracters = { }
- detect Supporters around the T*
while run do
    -detect object responses using randomized ferns
    -detect all possible candidates using
    online template-based model
    for each candidate do
        -calculate the supporting score (Eq. 3)
        if supporting score is strong then
        | -add candidate to Strong Candidates
        end
    end
    if Strong Candidates ≠ {θ} then
        -T* ← object with max confidence score
    end
    -run greedy data association to find T*
    and Distracters based on their confidence
    score.
    for each tracker do
        -update its posterior probability (Eq. 1) in randomized ferns
        -update its online template-based object model
    end
    if T* has high confidence score then
        -update Supporters (active and passive)
        by matching with supporters around T*.
        -update Distracters with new
        regions has high confidence score ≠ T*
    end
end In some implementations, eight ferns and four 6 bitBP features per fern can be used. All thresholds can be fixed as described. The threshold used to validate the correct target can be calculated by the NCC between a candidate and the online object model. It can be set at 80% according to the experiment demonstrated in Z. Kalal, et al., "Online learning of robust object detectors during unstable tracking", which also shows that LOOP event outperforms the other growing ones. The scanning window can start searching the minimum region of 20×20. For a sequence of resolution 320× 240, the number of search windows can be 100 k, while in 640×480 the number of search windows can be 600 k, approximately.

It is worth noting that the complexity of the algorithm is affected by the number of supporters and distracters. In some experiments, the maximum number of active supporters was observed to be around 30-40, while that of distracters was around 10-15. Hence, the maximum of the most similar distracters can be limited to 15, and that of supporters can be limited to 30 to guarantee a reasonable running time, in some implementations. Without code optimization, a C++ implementation of the context tracker can run comfortably at 10-25 fps on 320×240 sequences depending on the density of supporters and distracters, which means without using context information, the method can run at 25 fps, while in a heavy case, the algorithm slows down to 10 fps. To show the performance of the tracker, the experiments were carried out in two different setups: one is to evaluate the contribution of context in the tracker, and the other is to compare the present systems and techniques with various state-of-the-art methods.

For context performance evaluation, the tracker is compared with and without context elements. The PNTracker is used as reference. It is worth noting that the implementation of PNTracker is the combination implementation of "Online learning of robust object detectors during unstable tracking" and "P-N learning: Bootstrapping binary classifiers by structural constraints". To emphasize the contribution of context in terms of distracters and supporters, two very challenging sequences were chosen, which contain similar objects that move: Multiplefaces and Babies.

Figure 5A:
Figure 5B:
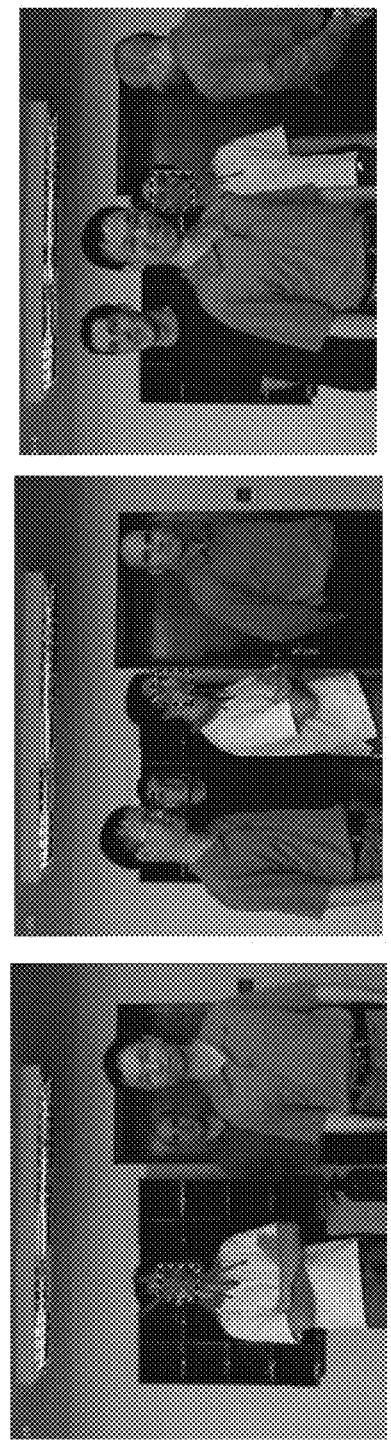

The Multiplefaces sequence drawn from the SPEVI data set is very difficult with four people moving around. It contains several challenges such as out of plane rotation, total occlusion, and target leaving FoV. It is hard to differentiate between the other faces and the target. While the tracker described herein easily ignores the other objects using distracters and supporters, the PNTracker occasionally switches to another face during tracking. To avoid randomization effects, each tracker was run five times and several drift cases of PNTracker, which makes it fail to recover, were observed. The results are shown in FIGS. 5A-5B. FIG. 5A shows that the PNTracker loses the target in the Multiplefaces sequence. FIG. 5B shows that the present tracker maintains the target in the Multiplefaces sequence.

The Babies video shows a triplet of three babies playing on the ground. This sequence is really interesting and challenging because they all look alike. PNTracker jumps to the face of another baby as soon as the target has some appearance change. The present tracker successfully keeps following the right target till the end, as shown in FIGS. 5C-5D. FIG. 5C shows that the PNTracker loses the target in the Babies video. FIG. 5D shows that the present tracker maintains the target in the Babies video. Further, it is important to note that in most of the cases where no strong context exists, the present tracker still shows overall better results than PNTracker and outperforms other state-of-the-art methods.

To demonstrate the performance of the present context tracker, it is compared against several state-of-the-art methods including: FragTracker (FT) (A. Adam, et al., "Robust fragments-based tracking using the integral histogram", in CVPR, pages 798-805, 2006), MIL-Tracker (MILT) (B. Babenko, et al., "Visual tracking with online multiple instance learning", in CVPR, pages 983-990, 2009), CotrainingTracker (CoTT) (M. Yang, et al., "Context-aware visual tracking", in PAMI, volume 31, pages 1195-1209, 2009), PNTracker (PNT) (Z. Kalal, et al., "P-N learning: Bootstrapping binary classifiers by structural constraints", in CVPR, pages 49-56, 2010), DNBSTracker (DNBS) (A. Li, et al., "Discriminative nonorthogonal binary subspace tracking", in ECCV, pages 238-271, 2010), and VTD-Tracker (VDT) (J. S. Kwon, et al., "Visual tracking decomposition", in CVPR, pages 1269-1276, 2010). All codes come from the original authors.

The chosen data set includes several challenging sequences: Motocross and Carchase (in Z. Kalal, et al., "P-N learning: Bootstrapping binary classifiers by structural constraints", in CVPR, pages 49-56, 2010), Vehicle (in M. Yang, et al., "Context-aware visual tracking", in PAMI, volume 31, pages 1195-1209, 2009), Liquor, ETHPedestrian, Multifaces, Clutter and Scale, and Animal (used in J. S. Kwon, et al., "Visual tracking decomposition", in CVPR, pages 1269-1276, 2010), and Girl (in B. Babenko, et al., "Visual tracking with online multiple instance learning", in CVPR, pages 983-990, 2009). They contain occlusion and object leaving FoV (Motocross. Carchase. Vehicle. ETHPedestrian, Multifaces, Girl), very cluttered background (Carchase, Liquor ETHPedestrian, Multifaces) out-of-plane rotation (Carchase, Vehicle, Multifaces, Girl), abrupt motion (Motocross, Clutter, Scale, Animal), and motion blur (Liquor, Clutter, Animal). Several of them are recorded in unconstrained environments such as Motocross. Vehicle, ETHPedestrlan, Carchase, and Animal.

| Video Sequence | Frames | FT | MILT | CoTT | DNBS | VTD | PNT | Ours |
| --- | --- | --- | --- | --- | --- | --- | --- | --- |
| Animal | 72 | 69 | 9 | 8 | 19 | 6 | 37 | 9 |
| Carchase | 5000 | lost@355 | lost@355 | lost@409 | lost@364 | lost@357 | lost@1645 | 24 |
| Clutter | 1528 | lost@1,081 | lost@413 | 9 | 6 | 6 | 4 | 6 |
| ETHPedestrian | 874 | lost@95 | lost@95 | lost@95 | lost@635 | lost@95 | 10 | 16 |
| Girl | 502 | lost@248 | 30 | 14 | 39 | 69 | 19 | 18 |
| Liquor | 1407 | lost@47 | lost@288 | 30 | lost@404 | lost@404 | 21 | 10 |
| Motocross | 2665 | lost@137 | lost@485 | lost@591 | lost@10 | lost@10 | 10 | 12 |
| Multifaces | 1006 | lost@64 | lost@64 | lost@394 | lost@64 | lost@64 | lost@97 | 26 |
| Scale | 1911 | 8 | 11 | 6 | lost@269 | 3 | 6 | 2 |
| Vehicle | 946 | lost@679 | lost@481 | 9 | lost@517 | lost@517 | 8 | 8 |
| Speed (fps, on 320 × 240) | | 1.6 | 14 | 2 | 7 | 0.2 | 12* | 10 |

Table 2 above shows average center location error (pixels) and performance comparison between the trackers: FT, MILT, CoTT, DNBS, VTD, PNT, and the present tracker (Ours) in different challenging video sequences. The best performance is in bold, the second best is in italic. The numbers after "lost @" indicate the frame numbers when the tracker gets lost. The * indicates that the method was implemented on Matlab using C-Mex.

The metric used for comparison is the average center location error, which was adopted instead of the detection-criterion of the VOC (Visual Oject Classes) challenge because different trackers require different initial bounding boxes depending on the nature of their method. For example, template-based methods such as PNTracker and Frag-Tracker are initialized by a tight bounding box, while a detection-based method such as CoTT needs a loose one. However, because the chosen data sets are very challenging, with a number of long-term sequences, most existing methods fail somewhere in the middle of a sequence. Therefore, the frame number is noted where a tracker starts to lose the object and never reacquires it. This means that the result of a tracker is accepted even when it fails to get the right target in several frames before reacquisition happens. A target is considered "lost" if the overlapping region between its bounding box and the ground-truth is less than 50%.

Figure 6A:
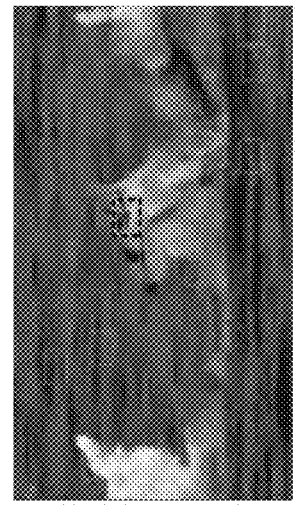
Figure 6A:
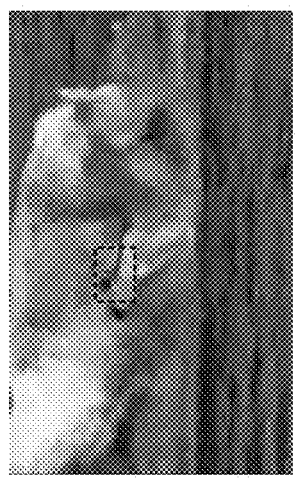
Figure 6A:
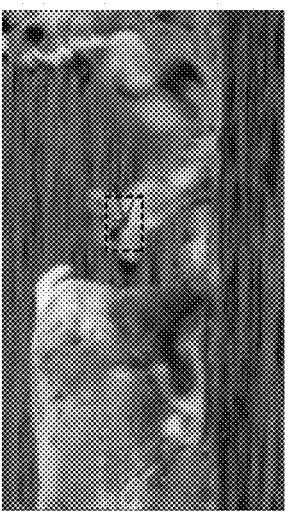
Figure 6B:
Figure 6B:
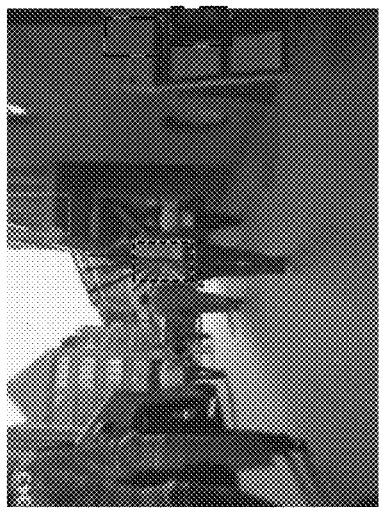
Figure 6B:
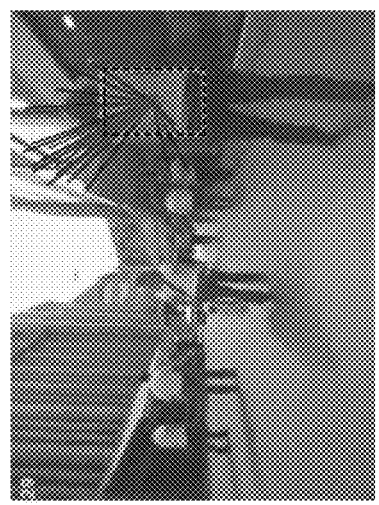

The quantitative comparisons are shown in Table 2 above. The running time comparison (in the last row) is for a raw reference as different methods have different search range which impacts the speed greatly. For example, FragTracker and MILTracker use exhaustive search in a small area. Increasing the range slows down the speed significantly as the number of candidates grows. In CoTT, the use of particle filter is also affected by the search range implicitly influenced by the number of the particles. PN-Tracker and the present tracker scan the whole image to find candidates. The running time of the present tracker also depends on the number of distracters discovered by the tracker. Those distracters are often few as observed in general cases. Some snapshots of the present context tracker operating on several sequences are shown in FIGS. 6A-6D. FIG. 6A shows the present context tracker operating on the Animal sequence. FIG. 6B shows the present context tracker operating on the ETHPedestrian sequence. FIG. 6C shows the present context tracker operating on the Motocross sequence. FIG. 6D shows the present context tracker operating on the Carchase sequence.

Overal, the present tracker has better performance than the PNTracker with the help of context, and outperforms all other approaches. Although most of them may work well in controlled environments, it is difficult for them to consistently follow the target in long-term sequences and in unconstrained environments. There are some large numbers in the results (e.g., Carchase and Multifaces) because it reacquires the object several frames later than the ground truth, which makes the overall score look not good when we calculate the error using its previous position. It is also important to note that the maximum number of frames run by VTDTracker is 1000 frames; hence, its results shown in Table 2 are the average of 1000 frames at the maximum.

Figure 7A:
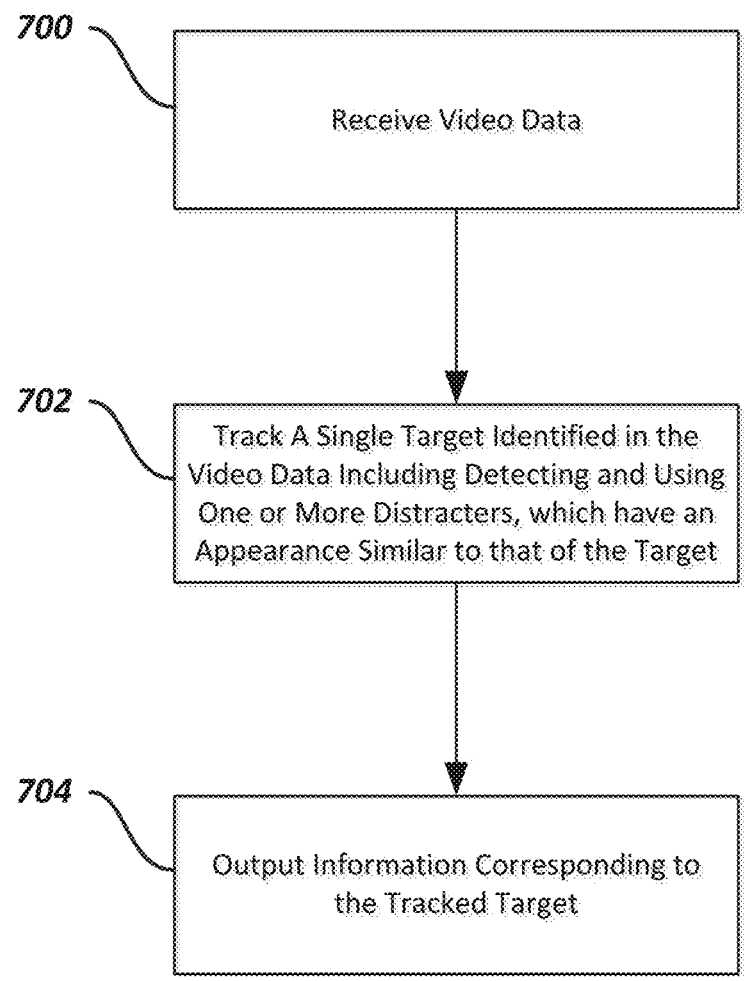
FIG. 7A shows a method of visual tracking in video data.

FIG. 7A shows a method of visual tracking in video data. Video data is received 700. This can include pre-recorded video sequences, such as described above, or live video images. A single target is tracked 702 in the video data, where this tracking includes detecting and using one or more distracters, which have an appearance similar to that of the tracked target. As discussed above, use of context information including one or more distracters in tracking a single target improves the tracking of that target. As will be appreciated, the same systems and techniques can be used to independently track respective single targets. Information corresponding to the tracked target can be output 704. Such information can be provided for use in various types of systems, such as face tracking and pedestrian tracking systems. For example, the bounding box of the object can be output in every frame, either on-the-fly (if it is a live application) by providing a function with bounding box output, or write out to an output file with a list of bounding boxes corresponding to each frame of the input video. Such output can be integrated with other systems to feed other applications. For example, some applications can include making a video clickable, such as with application to e-commerce. One may associate a link or a website to a part of an image in one frame (e.g., a jacket for instance), and the present systems and techniques can be implemented to allow the user to click on any frame (having that same image part) to access the link.

Figure 7B:
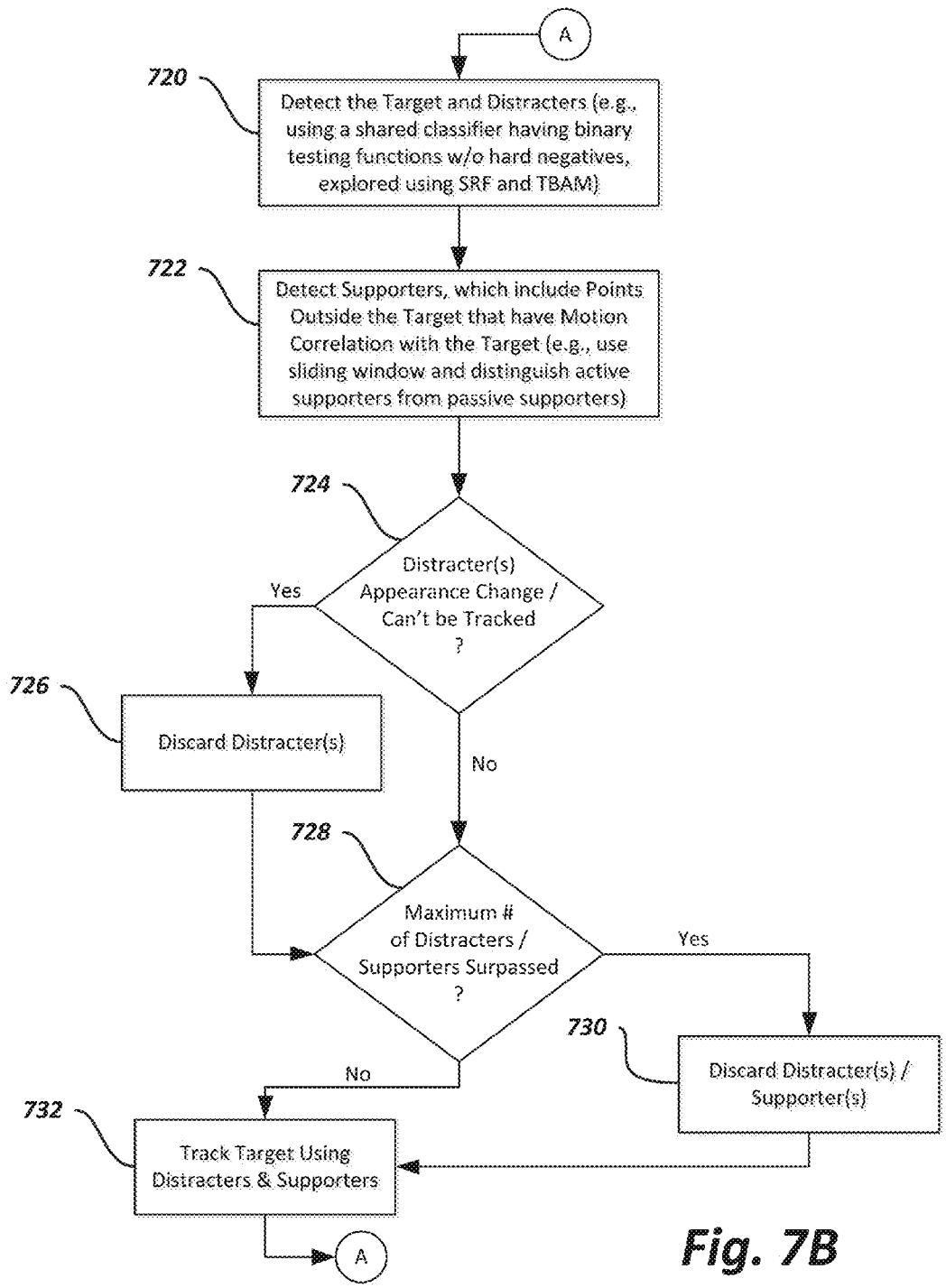
FIG. 7B shows a method of tracking a single target in video data.

FIG. 7B shows a method of tracking a single target in video data. The target and one or more distracters are detected 720 in video imagery. This can involve using a shared classifier having binary testing functions corresponding to positive and negative samples added during training, as described above, where the samples do not include hard negative samples. In addition, the one or more distracters can be explored using a sequential randomized forest and a template-based appearance model, where the template-based appearance model is constructed in a binary search tree using k-means, such as described above.

One or more supporters can also be detected 722. Such supporters include points outside of the tracked target that have motion correlation with the tracked target. The one or more supporters can be local features. In addition, detecting the one or more supporters can involve using a sliding window of k frames in the video imagery. Moreover, detecting the one or more supporters can involve distinguishing active supporters from passive supporters, such as described above.

If a distracter is determined 724 to have changed in appearance to no longer be similar to the target, or if a distracter can no longer be tracked, or both, any such distracters can be discarded 726. Furthermore, a check can be made 728 to determine if a maximum number of distracters and supporters has been surpassed, and if so, one or more of the least relevant distracters and supporters can be discarded 730. For example, a maximum number of the one or more distracters can be limited to fifteen, and a maximum number of the one or more supporters can be limited to thirty, as discussed in the example above. With a complete set of distracters and supporters in hand, the target is tracked 732 using those distracters and supporters, and the method continues by performing its detections and checks for the next image(s) in the video imagery.

Figure 7C:
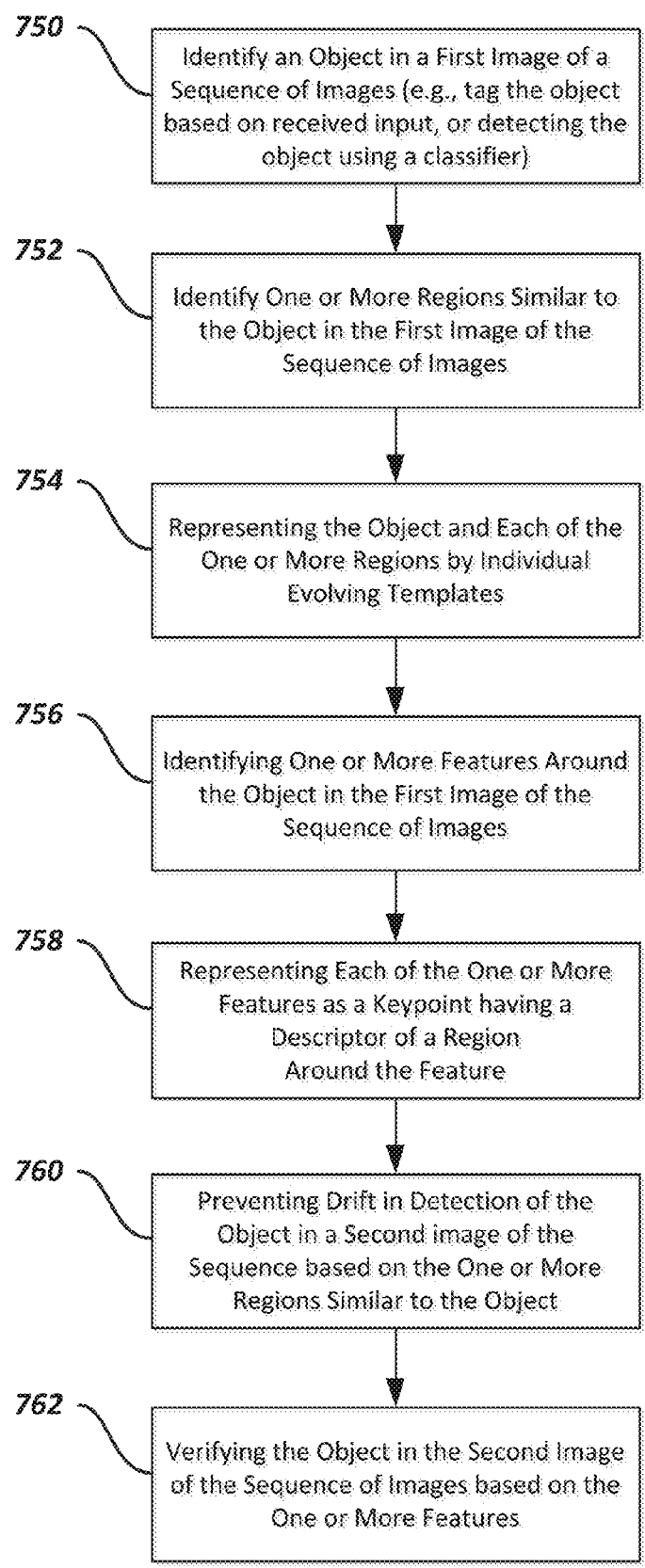
FIG. 7C shows another method of visual tracking in video data.

FIG. 7C shows another method of visual tracking in video data. An object is identified 750 in a first image of a sequence of images. Note that the "first" image is not necessarily the absolute first image in a sequence, but rather simply an image that comes before (but not necessarily immediately before) a second image of the sequence. Identifying the object can include tagging the object in the first image of the sequence of images based on received input, which can be input received from a user. For example, user input can include a point selection or a bounding box selection with respect to the image. In addition, identifying the object can include detecting the object in the first image of the sequence of images using a classifier.

One or more regions similar to the object can be identified 752 in the first image of the sequence of images. In some implementations, this can involve using a same classifier used to identify the target. In addition, the object and each of the one or more regions similar to the object can be represented 754 by individual evolving templates, such as described above.

One or more features around the object can be identified 756 in the first image of the sequence of images. This can involve distinguishing between features that actively support the object, since they co-occur with the object with a high frequency, and features that passively support the object. In addition, each of the one or more features can be represented 758 as a keypoint having a descriptor of a region around the feature, such as described above.

Drift in detection of the object in a second image of the sequence of images can then be prevented 760 based on the one or more regions similar to the object, and the object can be verified 762 in the second image of the sequence of images based on the one or more features. As will be appreciated from the description above, the method of FIG. 7C can operate continuously on a sequence of images (not just a first image and a second image) to actively track the object through the entire sequence. Moreover, the regions and features can be actively updated from frame to frame in the sequence, and discarded when no longer useful in providing context for the tracked object.

The processes described above, and all of the functional operations described in this specification, can be implemented in electronic circuitry, or in computer hardware, firmware, software, or in combinations of them, such as the structural means disclosed in this specification and structural equivalents thereof, including potentially a program (stored in a machine-readable medium) operable to cause one or more programmable machines including processor(s) (e.g., a computer) to perform the operations described. It will be appreciated that the order of operations presented is shown only for the purpose of clarity in this description. No particular order may be required for these operations to achieve desirable results, and various operations can occur simultaneously or at least concurrently. In certain implementations, multitasking and parallel processing may be preferable.

The various implementations described above have been presented by way of example only, and not limitation. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, the principles, elements and features described may be employed in varied and numerous implementations, and various modifications may be made to the described embodiments without departing from the spirit and scope of the invention. For example, the present systems and techniques can be used to develop a tracker that can handle articulated objects and fast appearance change. A parts-based approach can be used to handle an articulated object by splitting the object into parts, and each of the parts can be treated independently but with respect to the topology from which it is originally generated. The tracker can be applied to each part, which can be optimized with the contraints of the object's configuration. For fast appearance change, the contour of the object can be used because the contour is typically not as sensitive to fast appearance change as texture features. Thus, with this combination, the tracker can more readily deal with fast appearance change. As another example, the systems and techniques described can be extended it to multiple object tracking by integrating the current appearance model approach with a motion model and global optimization in order to address the data association issue typical in multiple object tracking. In some implementations, multiple parallel trackers can be used for several windows.

Accordingly, other embodiments may be within the scope of the following claims.

What is claimed is:

1. A method comprising:
receiving video data;
tracking a single target identified in the video data, the tracking comprising detecting and using one or more distracters, which have an appearance similar to that of the tracked target in that each of the one or more distracters is a likely false positive for a classifier that detects the single target, wherein the tracking comprises detecting and using one or more supporters, which include points outside of the tracked target that have motion correlation with the tracked target;
detecting the target and the one or more distracters using a shared classifier having binary testing functions corresponding to positive and negative samples added during training, but not including hard negative samples;
discarding a distracter from the one or more distracters when its appearance changes to no longer be similar to the target, or when it can no longer be tracked, or both; and
outputting information corresponding to the tracked target.

2. The method of claim 1, wherein the one or more distracters are explored using a sequential randomized forest and a template-based appearance model, wherein the template-based appearance model is constructed in a binary search tree using k-means, and the one or more supporters are local features.

3. A method of comprising:
receiving video data;
tracking a single target identified in the video data, the tracking comprising detecting and using one or more distracters, which have an appearance similar to that of the tracked target in that each of the one or more distracters is a likely false positive for a classifier that detects the single target, wherein the tracking comprises detecting and using one or more supporters, which include points outside of the tracked target that have motion correlation with the tracked target;
limiting a maximum number of the one or more distracters and a maximum number of the one or more supporters; and
outputting information corresponding to the tracked target.

4. The method of claim 3, comprising:
detecting the one or more supporters using a sliding window of k frames in the video data and by distinguishing active supporters from passive supporters.

5. A system comprising:
a video acquisition system; and
processor electronics configured to track a single target identified in video data from the video acquisition system, including detecting and using one or more distracters, which have an appearance similar to that of the tracked target in that each of the one or more distracters is a likely false positive for a classifier that detects the single target, and to output information corresponding to the tracked target;
wherein the processor electronics are configured to detect and use one or more supporters, which include points outside of the tracked target that have motion correlation with the tracked target, to track the single target; and
wherein the processor electronics are configured to detect the target and the one or more distracters using a shared classifier having binary testing functions corresponding to positive and negative samples added during training, but not including hard negative samples.

6. The system of claim 5, wherein the processor electronics are configured to discard a distracter from the one or more distracters when its appearance changes to no longer be similar to the target, or when it can no longer be tracked, or both.

7. The system of claim 5, wherein the processor electronics are configured to detect the one or more supporters using a sliding window of k frames in the video data and by distinguishing active supporters from passive supporters.

8. The system of claim 5, comprising a server computer system and a client computer system, wherein the client computer system comprises the video acquisition system, and the server computer system comprising the processor electronics.

9. A system comprising:
a video acquisition system; and
processor electronics configured to track a single target identified in video data from the video acquisition system, including detecting and using one or more distracters, which have an appearance similar to that of the tracked target in that each of the one or more distracters is a likely false positive for a classifier that detects the single target, and to output information corresponding to the tracked target;
wherein the processor electronics are configured to detect and use one or more supporters, which include points outside of the tracked target that have motion correlation with the tracked target, to track the single target; and
wherein the processor electronics are configured to limit a maximum number of the one or more distracters and a maximum number of the one or more supporters.

10. The system of claim 9, wherein the one or more distracters are explored using a sequential randomized forest and a template-based appearance model.

11. The system of claim 10, wherein the template-based appearance model is constructed in a binary search tree using k-means, and the one or more supporters are local features.

* * * * *